(12) United States Patent
Robertson et al.

(10) Patent No.: US 8,522,151 B2
(45) Date of Patent: Aug. 27, 2013

(54) WIZARD FOR SELECTING VISUALIZATION

(75) Inventors: George G. Robertson, Seattle, WA (US); Sean Michael Boon, Snoqualmie, WA (US); Joshua W. Lee, Englewood, NJ (US); William Guthrie Morein, Cambridge, MA (US); Brian Scott Ruble, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 681 days.

(21) Appl. No.: 12/365,818

(22) Filed: Feb. 4, 2009

(65) Prior Publication Data
US 2010/0199181 A1   Aug. 5, 2010

(51) Int. Cl.
*G06F 3/00* (2006.01)
*G06F 3/01* (2006.01)

(52) U.S. Cl.
USPC ........... 715/751; 715/712; 715/762; 715/763; 715/772

(58) Field of Classification Search
USPC .................. 715/751, 772, 710–715, 762–763
See application file for complete search history.

(56) References Cited

U.S. PATENT DOCUMENTS

| | | | |
|---|---|---|---|
| 5,877,766 A * | 3/1999 | Bates et al. | 715/854 |
| 2003/0158855 A1 * | 8/2003 | Farnham et al. | 707/102 |
| 2004/0003042 A1 * | 1/2004 | Horvitz et al. | 709/204 |
| 2004/0054670 A1 * | 3/2004 | Noff et al. | 707/3 |
| 2005/0078172 A1 * | 4/2005 | Harville et al. | 348/14.09 |

* cited by examiner

*Primary Examiner* — Nicholas Augustine
(74) *Attorney, Agent, or Firm* — Lee & Hayes, PLLC (57) ABSTRACT

A visualization design system is provided. The system includes a metadata component to describe characteristics of data. An analyzer determines attributes of a peer group, where the attributes are related to prior visualization design experiences of the group. A wizard component determines a subset of potential visualization types based in part on the characteristics of data and the attributes of the peer group.

20 Claims, 10 Drawing Sheets

WIZARD FOR SELECTING VISUALIZATION

BACKGROUND

Data visualization refers to the visual representation of data, defined as information which has been abstracted in some schematic form, including attributes or variables for the units of information. With the rapid increase of computing power, larger and more complex numerical models for visualization have been developed, resulting in the generation of huge numerical data sets. Also, large data sets were generated by data acquisition devices such as medical scanners and microscopes, where data has been collected in large databases containing text, numerical information, and multimedia information. Thus, advanced computer graphics techniques were needed to process and visualize such data sets.

Visualization is often considered a part of a process of scientific computing that includes the use of computer modeling and simulation in scientific and engineering practice. More recently, visualization has increasingly been concerned with data from other sources, including large and heterogeneous data collections found in business and finance, administration, digital media, and so forth. A new research area called Information Visualization was launched in the early 1990s, to support analysis of abstract and heterogeneous data sets in many application areas.

Generally, data visualization is an evolving concept where definitional boundaries are continually expanding and, as such, is best defined in terms of loose generalizations. It refers to the more technologically advanced techniques, which allow visual interpretation of data through the representation, modeling and display of solids, surfaces, properties and animations. This involves the use of graphics, image processing, computer vision, and user interfaces. Data visualization also encompasses a much broader range of techniques than specific techniques such as solid modeling, for example. The success of data visualization is due to the soundness of the basic idea behind the technology including the use of computer-generated images to gain insight and knowledge from data and its inherent patterns and relationships. A second premise is the utilization of the broad bandwidth of the human sensory system in steering and interpreting complex processes, and simulations involving data sets from diverse scientific disciplines having large collections of abstract data from many sources. These concepts are important and have a profound and widespread impact on the methodology of computational science and engineering, as well as on management and administration.

One aspect to creating a desired visualization involves the use of design tools that attempt to help users create visualizations from some data source. In one example, a spreadsheet application attempted to characterize data and suggest potential visualizations based off the characterization. In another example, a software tool employed a "show me" feature to provide alternative visualizations based off some heuristic interpretation of the type of data being operated upon and preconceived notions about a potential visualization in view of the characterization. Unfortunately, although these tools could query the user for some primitive feedback, none of these tools were able to adequately determine what the user was visualizing in their own minds and more importantly what their intentions were for the respective design. More specifically, users themselves (especially first time users) were unable to adequately communicate what their design intentions were (to the tool via question/answer) when attempting to generate a desired visualization.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

A visualization system or tool is provided that exploits the expertise provided by network peer groups in aiding in the design of new visualizations. Such a system can include a wizard for selecting which visualization to use by automatically inspecting peer groups to allow users to determine which visualization might be most suitable for their respective designs. The peer group can drive visualization experience from group feedback, where data sources can be annotated to indicate what is being utilized to generate a given visualization, and so forth. One specific aspect involves the use of data mining on groups to determine aspects of visualization. In general, the peer group networks are exploited to help narrow the range of visualization possibilities for a respective user and move closer to their actual intentions for starting a design. The peer group can be defined as members of a class or can be mined to determine similarities to a given application. Data can be tagged via metadata to provide some clue as to how a particular type of data was visualized based off of past experiences of the group. Based off the metadata, an analyzer can then determine attributes of the group in view of the metadata that most closely match the users design goals or intent. Learning components can also be provided to further refine a possible set of design alternatives to help users determine a desired visualization given a set of data. By utilizing prior experience derived from the peer group, new designers can find a desired visualization design even though they may not be able to adequately express their design intentions beforehand.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Systems and methods enable designers to develop visualizations by exploiting expertise categorized or mined from peer group networks. In one aspect, a visualization design system is provided. The system includes a metadata component to describe characteristics of data. An analyzer determines attributes of a peer group, where the attributes related to prior visualization design experiences of the group. A wizard component determines a subset of potential visualization types based in part on the characteristics of data and the attributes of the peer group.

As used in this application, the terms "component," "mining," "attribute," "learning," "visualization," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
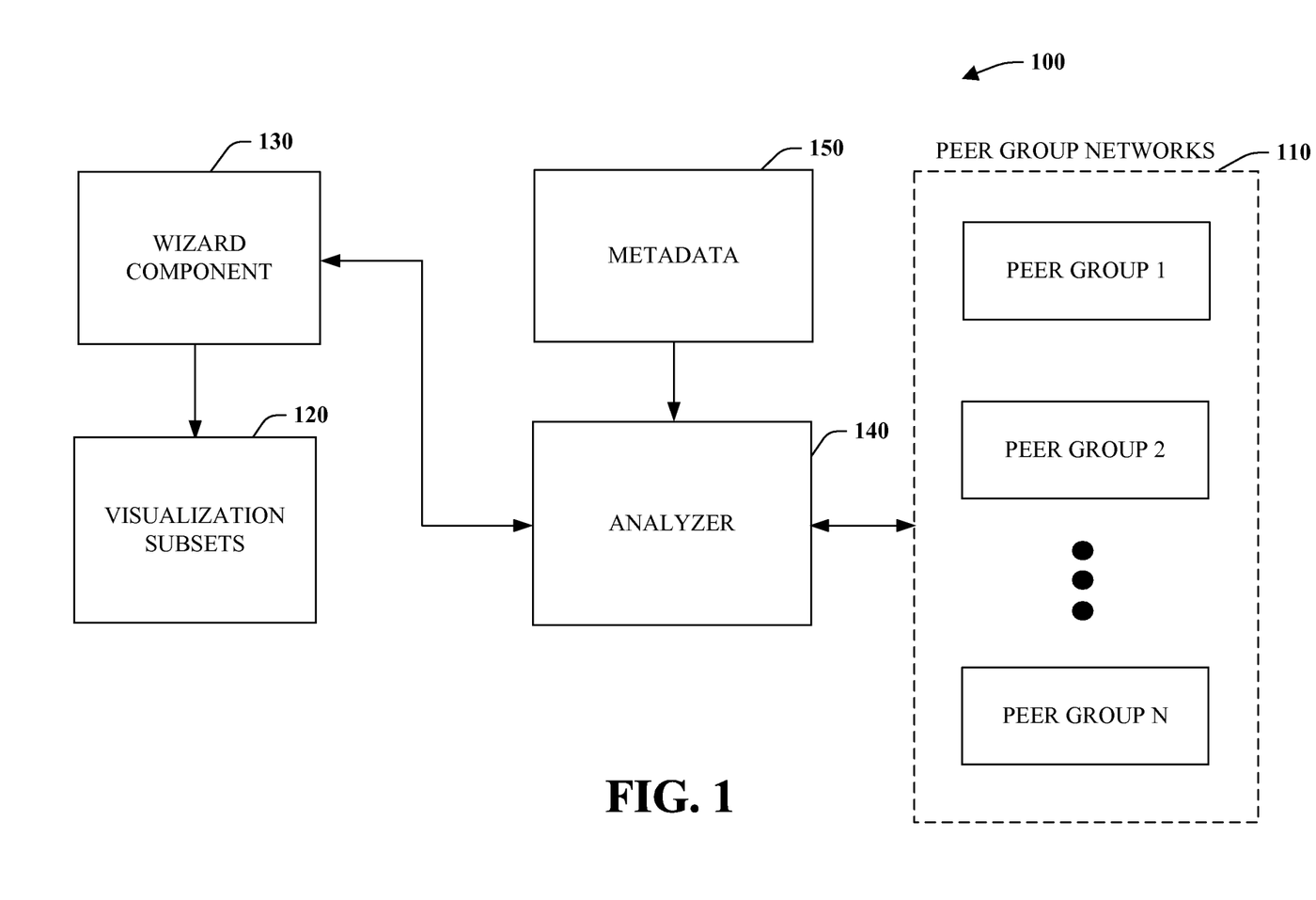
FIG. 1 is a schematic block diagram illustrating a system that analyzes peer groups to help determine potential visualizations.

Referring initially to FIG. 1, a system 100 analyzes peer groups 110 to help determine potential visualizations. The peer groups 110 can be associated with a plurality of local and/or remote network databases and includes experience information employed to facilitate design of a visualization subset 120 that is generated by a wizard component 130 (or wizard). The experience information is generally derived from a peer group of similarly situated users in the peer group 110. The wizard 130 is a tool that leads a user to a desired outcome through a sequence of actions, where the sequence can include audio, video, discrete images, textual exchanges, and so forth. In this case, the wizard 130 is employed to help a visualization designer craft a desired visualization by utilizing mined or inferred data from the peer groups 110. As shown, an analyzer 140 processes metadata 150 and peer group data 110 to generate visualization experience information for the wizard 130. The metadata 150 can be associated with various tags on data. Some tags may indicate what type of users or peers have operated on similar types of data (or data sets) in the past. Other tags may indicate suitable visualization forms or subsets 120 given a respective data type. Still yet other tags may indicate a relationship between a designer and one or more other members of the peer group 110. Yet another type of tag is an annotation that describes how a particular visualization was created in the past or how a particular data set was visualized.

The system 100 can be provided as a tool that exploits the expertise provided by network peer groups 110 in aiding in the design of new visualizations. Such a system can include the wizard 130 for selecting which visualization subsets 120 to use (from a plurality of visualization possibilities) by automatically inspecting peer groups 110 to allow users to determine which visualization might be most suitable for their respective designs. The peer group 110 can drive visualization experience from group feedback (real time and/or stored knowledge/experience), where data sources can be annotated via metadata 150 to indicate what is being utilized to generate a given visualization, and so forth. One specific aspect involves the use of data mining or learning on peer groups 110 to determine aspects of visualization. In general, the peer group networks 110 are exploited to help narrow the range of visualization possibilities for a respective user and move closer to their actual intentions for starting a design.

The peer group 110 can be defined as members of a class or can be mined/inferred to determine similarities to a given application. Data can be tagged via metadata 150 to provide some clue as to how a particular type of data was visualized based off of past experiences of the peer group 110. Based off the metadata 150 and peer group data 110, the analyzer 140 can then determine attributes of the group in view of the metadata that most closely matches the user's design goals or intent. Learning components (described below) can also be provided to further refine a possible set of design alternatives to help users determine a desired visualization given a set of data. By utilizing prior experience derived from the peer group 110, new designers can find a desired visualization design even though they may not be able to adequately express their present design intentions beforehand. In general, the visualization subsets 120 generated by the wizard 130 can be viewed as a filtered set of possible visualization alternatives given a current set of data the user desires to visualize electronically, given some understanding of the user (expressed via profile described below), given the metadata 150, and in view of past visualization experiences derived from the peer groups 110. In another aspect, a visualization design system 100 is provided. The system 100 includes means for analyzing (e.g., analyzer 140) visualization information associated with one or more peer groups. The system includes means for tagging data (e.g., metadata 150) that relates to the potential design of a visualization and means for generating at least one visualization (e.g., wizard 130) from a current data set in view of the peer groups or the tagged data.

Figure 2:
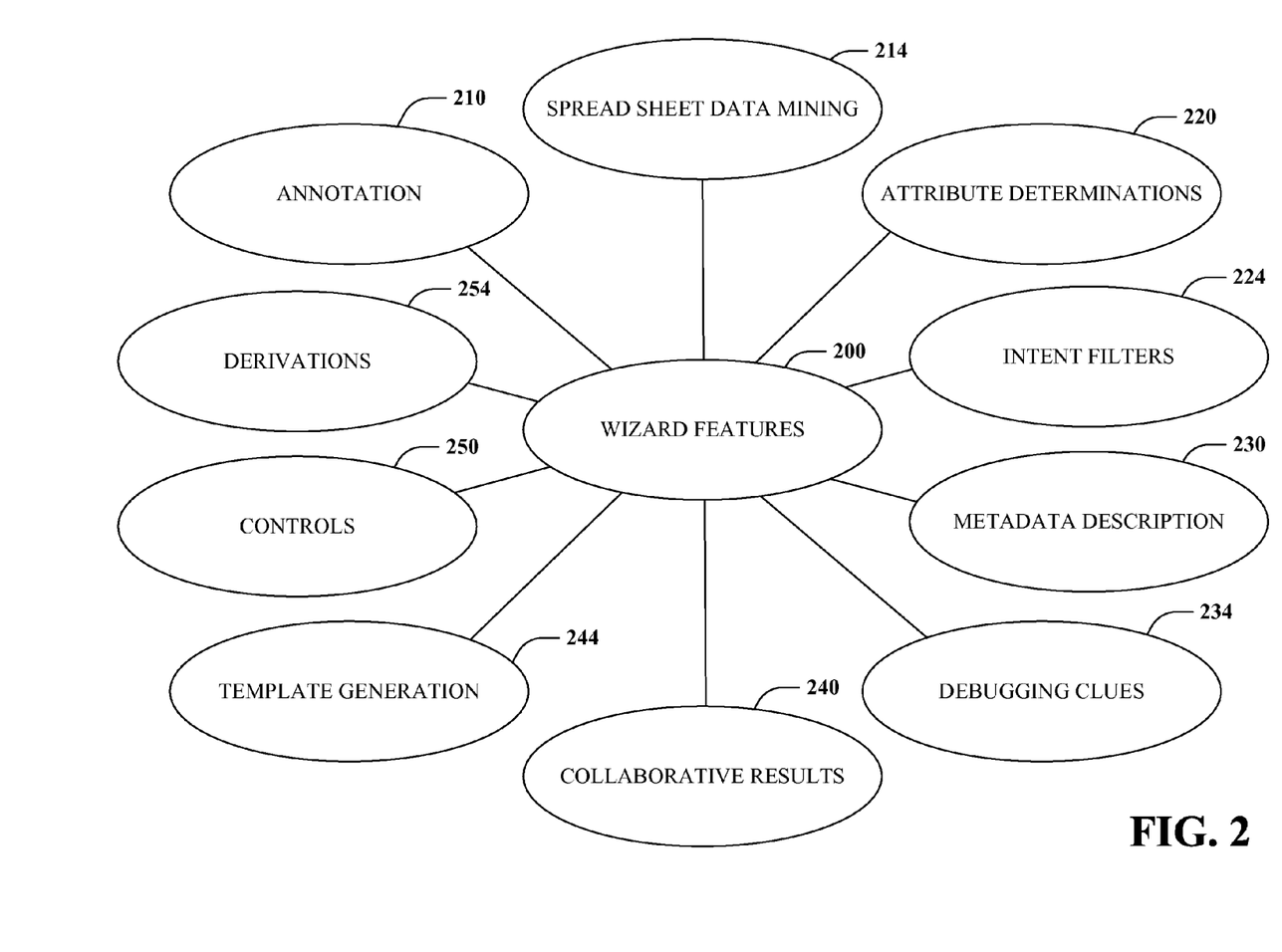
FIG. 2 is a block diagram that illustrates example wizard features in accordance with a system that analyzes peer groups to help determine potential visualizations.

Referring now to FIG. 2, example wizard features 200 are illustrated in accordance with a system that analyzes peer groups to help determine potential visualizations. At 210, annotation can be added to data or visualizations that provide some indication of past knowledge of a given data set or on how a particular visualization was generated. At 214, data mining can be employed on spreadsheet data for example. Thus, move from arbitrary data types to visualization did not perform properly, and thus characterize subgroups within charts. If one were an analyst, this is the type of view is desirable, if one were a home user for example, there is a different view/mapping that may be applicable. Data mining on peer groups can determine such nuances of the user and/or group.

At 220, trends, organizations, and user characteristics are analyzed. This includes learning from personal data, learning visualizations, and analyzing for trends and queries, defining how one group of users in a company might visualize a problem, and allowing another similarly situated group of users to use similar models of visualization, or sharing models. At 224, intent filters can be employed for customizing visualizations. This can include generating some notion of intent with a data source to convey what a possible visualization might appear as, e.g., adding intent to social network, filter down world of visualization by providing notion of who users are. If having difficulties determining the user's intent, the wizard can have the user provide a couple of words that are interesting to user, discovering intent by recognizing someone else's intent. The concept has some similarity to search engines providing search terms for visualization.

At 230, primitive information can be assigned via metadata description. Thus, assign primitive level information at the table level or query level that provides some clue on how to build visualization, for example. Assign as metadata as user is building from those primitive structures, where potential visualizations appear from the assigned primitives. At 234, improved debugging tools can be provided by the wizard to cleanup outliers of data. In some cases, spreadsheet applications do not provide many clues on how to debug data, thus how can users analyze statistical operations that apply to data. The wizard provides intelligent crosschecks to ensure visualizations make sense based on criteria for that type of data, not necessarily trying to prevent people from designing but providing explanations as a guide to building better visualizations, e.g., is that really what your intent was?

At 240, collaborative end results allow for persistence of results. Collaborative visualizations and suggestions can be persisted and passed along to other users, e.g., adding annotations to visualizations, when users are invoking security, persisting to the respective data levels, and so forth. At 244, templates can be generated that capture visualization foundations. Thus, a format painter or overlay data, for example, on top of some template the user finds suitable, and provide suggestions to apply to data. Templates capture stylistic aspects of charts such as with cut and paste functionality for style, format painter for style, how to parse out a particular visual effect and apply to data, which allows separation of design and data.

At 250, bidirectional design style is provided in view of one or more controls. This can include drag and drop of styles for instance to add styles to data and format data according to predetermined style templates. At 254, various visualization derivations can be provided. This can include scanning visualizations and automatically determining the components of the scan in order to explore visualization experience and understand the fundamentals of a given visualization design.

Figure 3:
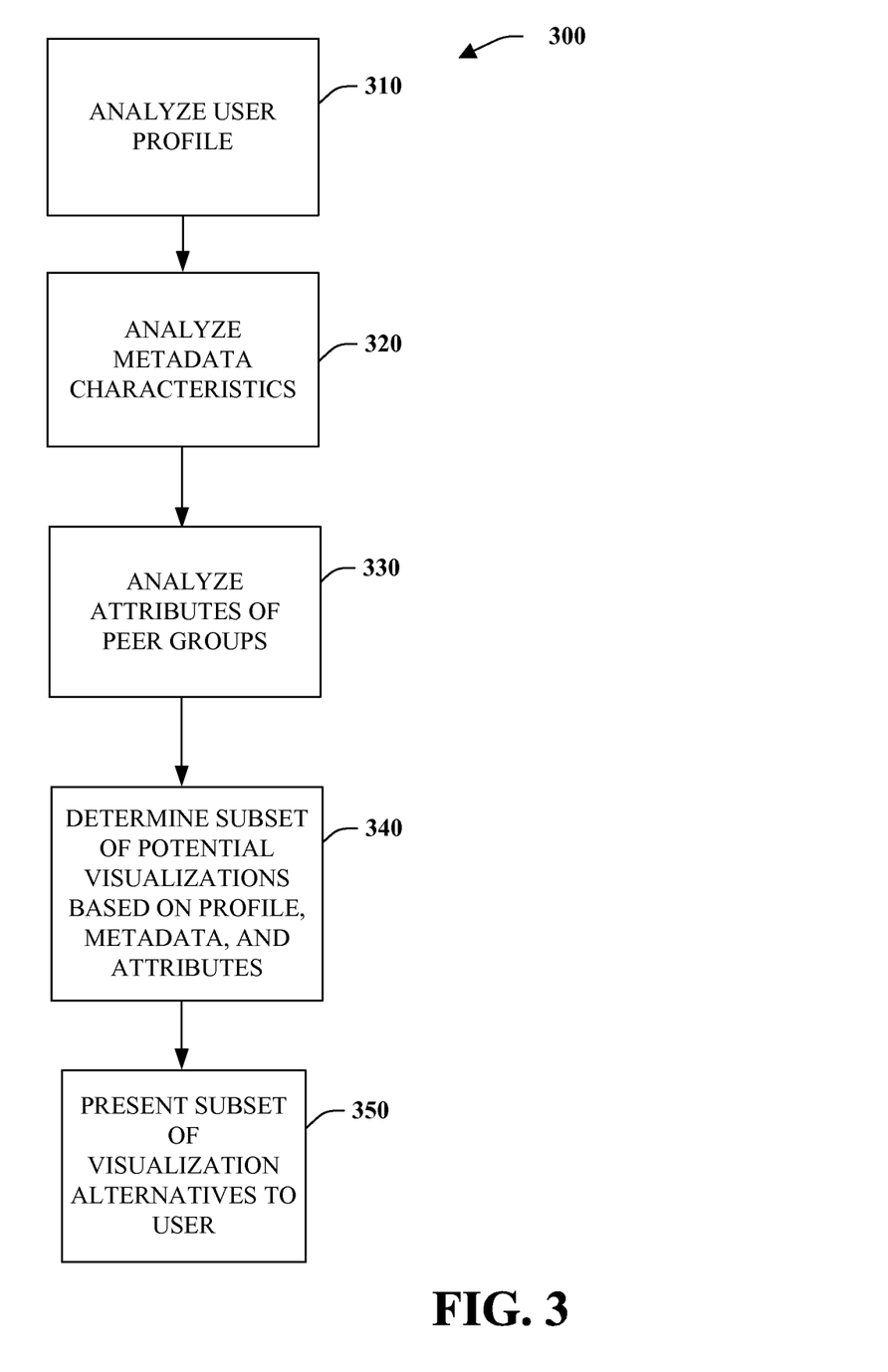
FIG. 3 is a flow diagram that illustrates a visualization design process.

Referring now to FIG. 3, a visualization design process is illustrated. While, for purposes of simplicity of explanation, the process is shown and described as a series or number of acts, it is to be understood and appreciated that the subject process is not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Turning to FIG. 3, a visualization design process 300 is illustrated. Proceeding to 310, a user profile is analyzed. The user profile provides some clues as to what a given user's intent may be and more importantly helps to identify other potential members of a peer group. Such profile is described in more detail below with respect to FIG. 4. At 320, metadata characteristics are analyzed. As noted previously, such characteristics can include data tags where some tags may indicate what type of users or peers have operated on similar types of data (or data sets) in the past. Other tags may indicate suitable visualization forms or subsets given a respective data type. Still yet other tags may indicate a relationship between a designer and one or more other members of the peer group. Another type of tag is an annotation that describes how a particular visualization was created in the past.

At 330, a peer group network is analyzed. This can include scanning local or remote data sources for experience information on how to visualize a particular data set at hand. Analysis of the profile, metadata, and peer groups can include data mining, learning, or other processes described below. At 340, a subset of potential visualizations are generated based on the profile, metadata, and peer information analysis described above. At 350, the generated visualization subset is presented to a user for potential selection as a design candidate from a current data set they desire to visualize (e.g., present one or more visualization alternatives via wizard component that has helped determine the user's design intentions and narrowed the range of possibilities).

Figure 4:
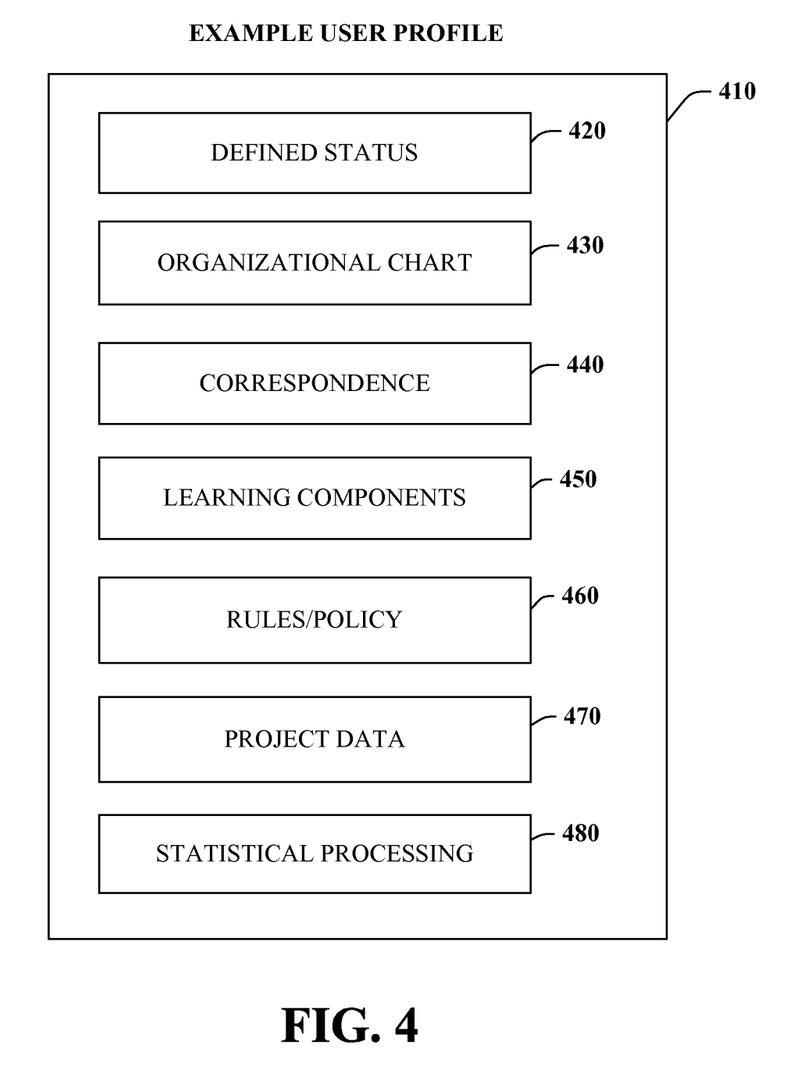
FIG. 4 illustrates a user profile to facilitate identifying members of a peer group.

Referring now to FIG. 4, a user profile 410 is employed to facilitate identifying members of a peer group. The profile component 410 shows example factors that may be employed to identify users as belonging to a peer group. It is to be appreciated that substantially any component that analyzes user data can be employed. Proceeding to 420, one aspect for a user profile includes a defined status made by a user. This could include an explicit representation such as design engineer, accountant, business development and so forth. Other designations could include membership in departments, projects, or other groups. Such designations allow analysis components to find similar peer group members potentially having experience with a particular type of visualization.

At 430, electronic organizational charts can be analyzed to determine peer group relationships for a given user. At 440, the types of correspondence that a particular user has may be analyzed as an indication of a user's membership or relationship to a peer group. This can include monitoring queries that a respective user may make during the work day such as questions generated in a meeting or from laptop queries or other electronic media (e.g., e-mails, instant messages, voice mails, ands so forth). This may include local database searches for information in relation to a given topic where such query data (e.g., key words employed for search) can be employed to potentially determine membership to a peer group. Remote queries can also be processed such as from the Internet where data learned or derived from a respective query can be used to determine group relationships.

At 450, one or more learning components can be employed by the profile component 410. This can include substantially any type of learning process that monitors activities over time to determine group relationships or analyze the user's intent for creating a given visualization. For example, a user could be monitored for such aspects as where in the visualization they analyze first, where their eyes tend to gaze, how much time they spend reading near key words and so forth, where the learning components 450 are trained over time to capture nuances of the user or group. The learning components 450 can also be fed with predetermined data such as controls that weight such aspects as key words or word clues that may influence the component 410. Learning components 450 can include substantially any type of artificial intelligence component including neural networks, Bayesian components, Hidden Markov Models, Classifiers such as Support Vector Machines and so forth.

At 460, rules or policy components can be provided (e.g., via user interface) to enable users to define relationships, metadata constructs, or other aspects to help define their intent. At 470, substantially any type of project data can be analyzed to determine relationships. This may include design notes, files, schematics, drawings, comments, e-mails, presentation slides, or other communications. This could also include audio or video data from a meeting for example where such data could be linked externally from the meeting. For example, when a particular data structure is tagged as having metadata associated with it, a subsequent user could mine such data to help generate a related visualization.

At 480, substantially any type of statistical process can be employed to generate or determine peer data. This can include monitoring certain types of words such as key words for example for their frequency, for word nearness or distance to other words in a paragraph (or other media), or substantially any type of statistical processes that is employed to indicate additional context for a processed application or data structure. As can be appreciated, substantially any type of data that is processed by a user or group can be subsequently employed to select a subset of given visualizations.

It is noted that interfaces (not shown) can be provided to facilitate capturing data and tailoring visualizations based off the captured information. This can include a Graphical User Interface (GUI) to interact with the user or other components such as any type of application that sends, retrieves, processes, and/or manipulates data, receives, displays, formats, and/or communicates data, and/or facilitates operation of the system. For example, such interfaces can also be associated with an engine, server, client, editor tool or web browser although other type applications can be utilized.

The GUI can include a display having one or more display objects (not shown) for manipulating electronic sequences including such aspects as configurable icons, buttons, sliders, input boxes, selection options, menus, tabs and so forth having multiple configurable dimensions, shapes, colors, text, data and sounds to facilitate operations with the profile and/or the device. In addition, the GUI can also include a plurality of other inputs or controls for adjusting, manipulating, and configuring one or more aspects. This can include receiving user commands from a mouse, keyboard, speech input, web site, remote web service and/or other device such as a camera or video input to affect or modify operations of the GUI.

Figure 5:
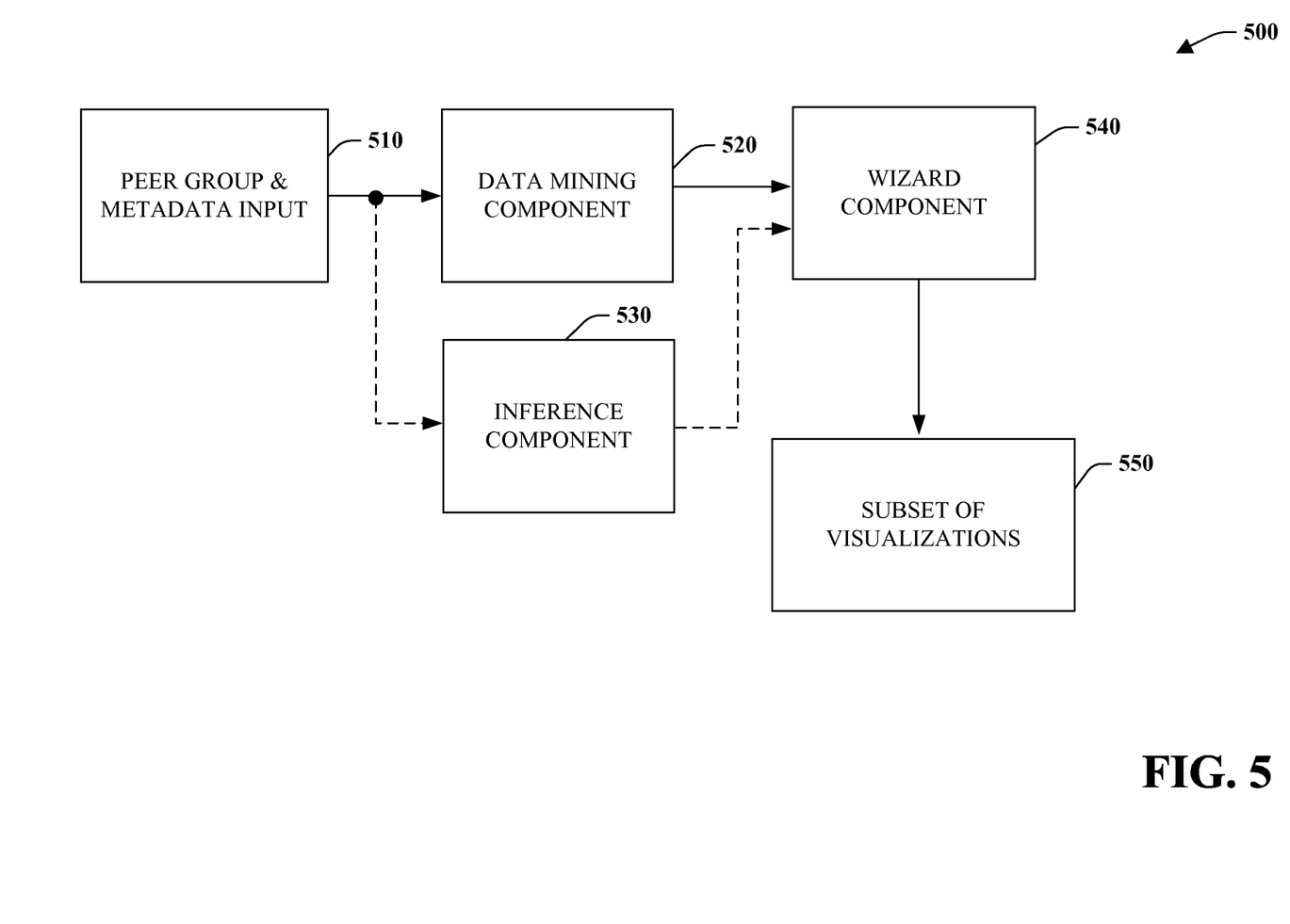
FIG. 5 illustrates a visualization system that generates visualization subsets from peer group and metadata sources.

Referring now to FIG. 5, a visualization system 500 generates visualization subsets from peer group and metadata sources. In this aspect, peer group and/or metadata group 510 is collected or aggregated. The data 510 can be processed by a data mining component 520 and/or an inference component 530 to determine one or more potential visualizations. Such data 510 can be employed to determine other more suitable visualizations or can be utilized to enhance a present visualization by augmenting the data with data derived from the peer group. As illustrated, after the data 510 is processed, a visualization component 540 dynamically generates a visualization subset at 550 that utilizes the peer group data determined by the data mining component 520 or the inference component 530.

The system 500 operates in a predictive or inference based mode and can be employed to supplement the analysis depicted in FIG. 1. Thus, even though a present data set may be partial or incomplete, the system 500 does not have to wait for all data to be collected but can generate refined data based off of predictions for missing members in the data set in real time. Predictions can also include observing trends in the data and predicting where subsequent data may be lead. Controls can be provided to enable users to enter queries or define policies that instruct the data mining component 520 or the inference component 530 for the types of information that may be of interest to a particular user. This includes anticipating a visualization 550 based off a function of data 510 received to that point. The system 500 can be employed as a predictive system for creating visualization options or subsets for users and dynamically refine the predictions or associated visualizations over time.

In yet another aspect, the peer and metadata 510 is analyzed according to trends or other type of analysis detected in the data that may indicate or predict what will happen in the future based off of presently received data values. Data mining 520 and/or inference components 530 (e.g., inference derived from learning components) are applied to data that has been received at a particular point in time. Based off of mining or learning on the received data, predictive values are generated and subsequently visualized at 550 according to one or more dynamically determined display visualizations for the respective predictions. Such visualizations can provide useful insights to those viewing the data, where predictive information is visualized to indicate how data or outcomes might change based on evidence gathered at a particular point in time. Feedback options (not shown) can be provided to enable users to guide visualizations or further query the system 500 for other types of predictive analysis based in part on the respective query supplied to the system.

Figure 6:
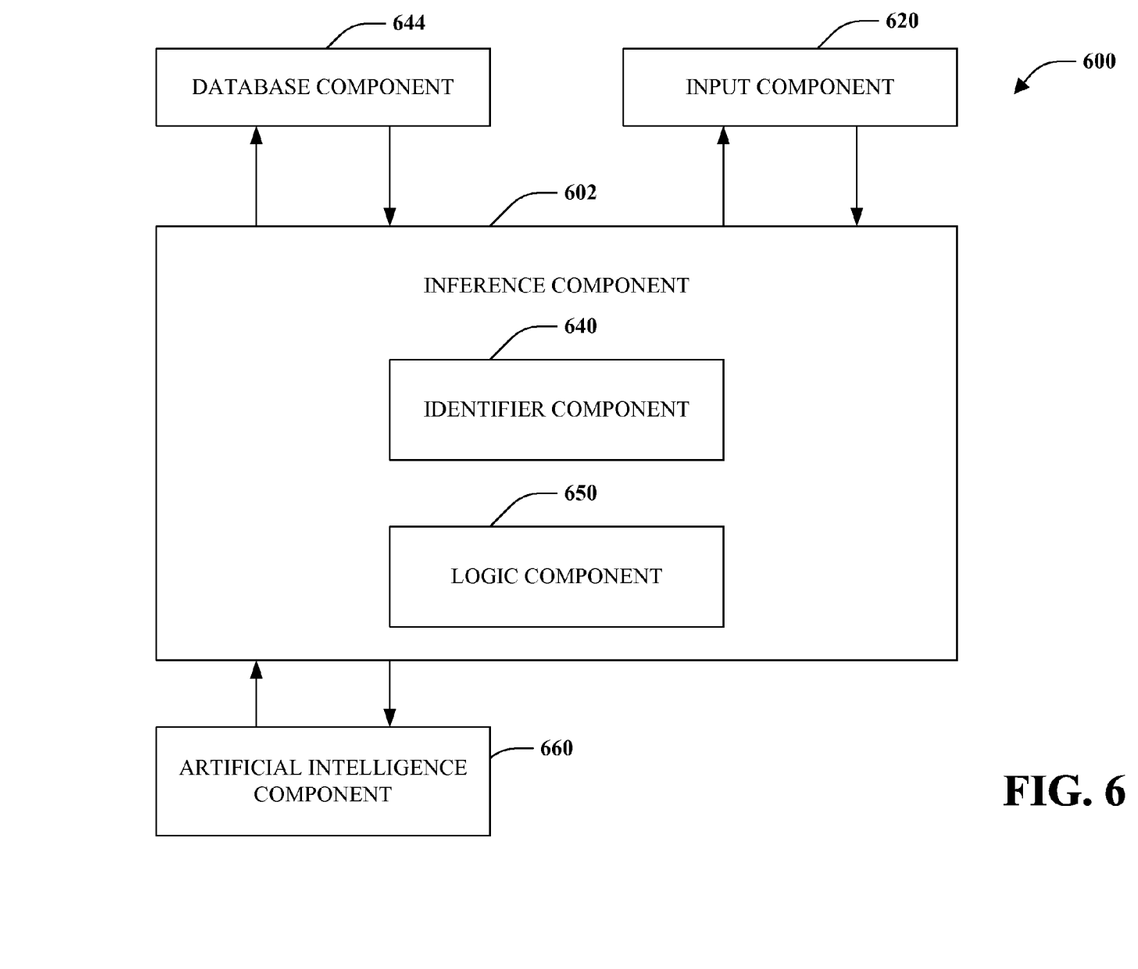
FIG. 6 illustrates an exemplary system for inferring visualizations from peer group data.

Turning now to FIG. 6, an exemplary system 600 is provided for inferring visualization subsets from a peer group. An inference component 602 receives a set of parameters from an input component 620. The parameters may be derived or decomposed from a specification provided by the user and parameters can be inferred, suggested, or determined based on logic or artificial intelligence. An identifier component 640 identifies suitable control steps, or methodologies to accomplish the determination of a particular data item (e.g., observing a data pattern and determining a suitable visualization). It should be appreciated that this may be performed by accessing a database component 644, which stores one or more component and methodology models. The inference component 602 can also employ a logic component 650 to determine which data component or model to use when analyzing peer group or metadata and determining a suitable visualization there from. As noted previously, classifiers or other learning components can be trained from past observations where such training can be applied to user actions, context, or peer group databases. From current received data, future predictions regarding the nature, shape, or pattern in the data can be predicted. Such predictions can be used to augment one or more dynamically generated visualization subsets as previously described.

When the identifier component 640 has identified the components or methodologies and defined models for the respective components or steps, the inference component 602 constructs, executes, selects, and/or modifies a visualization based upon an analysis or monitoring of a given application. In accordance with this aspect, an artificial intelligence component (AI) 660 automatically generates prediction data by monitoring real time data as it is received. The AI component 660 can include an inference component (not shown) that further enhances automated aspects of the AI components utilizing, in part, inference based schemes to facilitate inferring data from which to augment an application. The AI-based aspects can be affected via any suitable machine learning based technique or statistical-based techniques or probabilistic-based techniques or fuzzy logic techniques. Specifically, the AI component 660 can implement learning models based upon AI processes (e.g., confidence, inference). For example, a model can be generated via an automatic classifier system.

Figure 7:
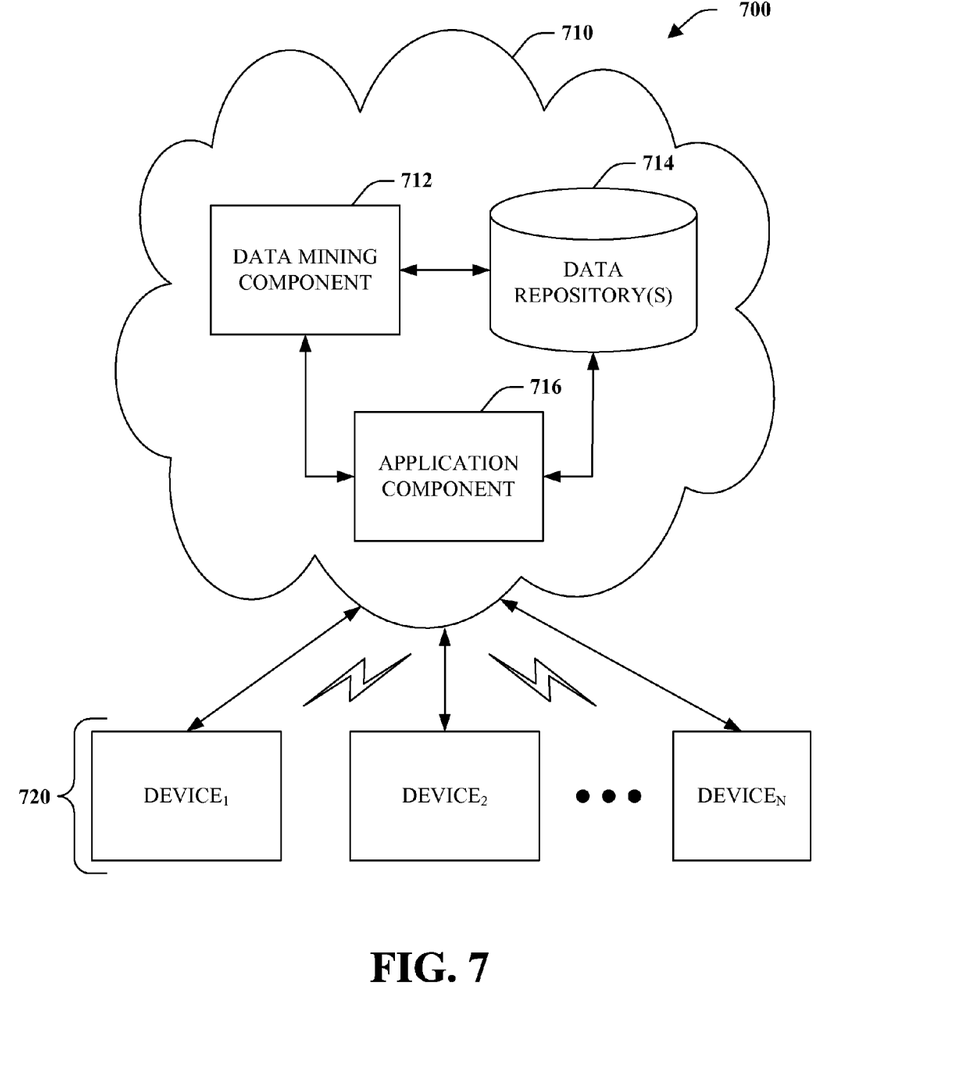
FIG. 7 illustrates a data mining system for analyzing peer group data.

Referring to FIG. 7, a data mining system 700 is employed to analyze peer group and metadata to determine a subset of visualizations. The system 700 include a collection of components that form a cloud-based personal data mining service 710, where the cloud represents substantially any source for peer group data or component metadata. The service 710 can be accessible to users over a wide area network (WAN) such as the Internet via one or more computers or computing devices 720 (DEVICE1 through DEVICEN, where N is greater than or equal to one). Such devices include, without limitation, thin client devices (e.g., computer terminal, mobile device . . . ) and/or devices owned by someone other than the user.

Here, the cloud-based service 710, or simply cloud service 710, can provide functionality for data mining. The service 710 can include a data mining component 712 and data repository(s) 714. The data mining component 712 provides a mechanism for identifying or uncovering implicit, previously unknown, and potentially useful information from the data housed in the communicatively coupled data repository(s) 714. For example, the data mining component 712 can unearth patterns and/or correlations amongst data and/or patterns of data collected over time. The data mining component 712 can employ a single or combination of analysis techniques including, without limitation, statistics, regression, neural networks, decision trees, Bayesian classifiers, Support Vector Machines, clusters, rule induction, nearest neighbor and the like to locate hidden knowledge within data. In one instance, a data-mining model is built and trained. Subsequently, the trained model is employed to identify patterns and/or correlations.

The data repository(s) 714 is operable to store personal user data associated with a plurality of users. In one instance, such data can include data generated by a user, owned by a user or otherwise linked thereto. By way of example, this data can include but is not limited to personal management information (PIM data), pictures, videos, documents, e-mail, instant messages, addresses, calendar dates/scheduling information (e.g., birthdays, anniversaries, appointments . . . ), voice mail, phone logs, RSS feeds, subscriptions, bookmarks, mail lists, project management features, computing device data, tasks and location data. In one instance, such data can be supplied by individual users via one or more devices 720. Additionally or alternatively, user data can be provided by third parties such as purchase data, identity data, web interaction, and so forth.

An application component 716 facilitates interaction with users and user devices 720. The application component 716 is communicatively coupled to the data mining component 712 and data repository(s) 714. Accordingly, the application component 716 is able to retrieve and/or store personal data (or other data) with respect to the data repository(s) 714. Furthermore, the application component 716 can support receiving and/or retrieving data mining results. The application component 716 is also operable to apply an additional level of processing to data mining results to interpret the results and provide users with useful information.

Figure 8:
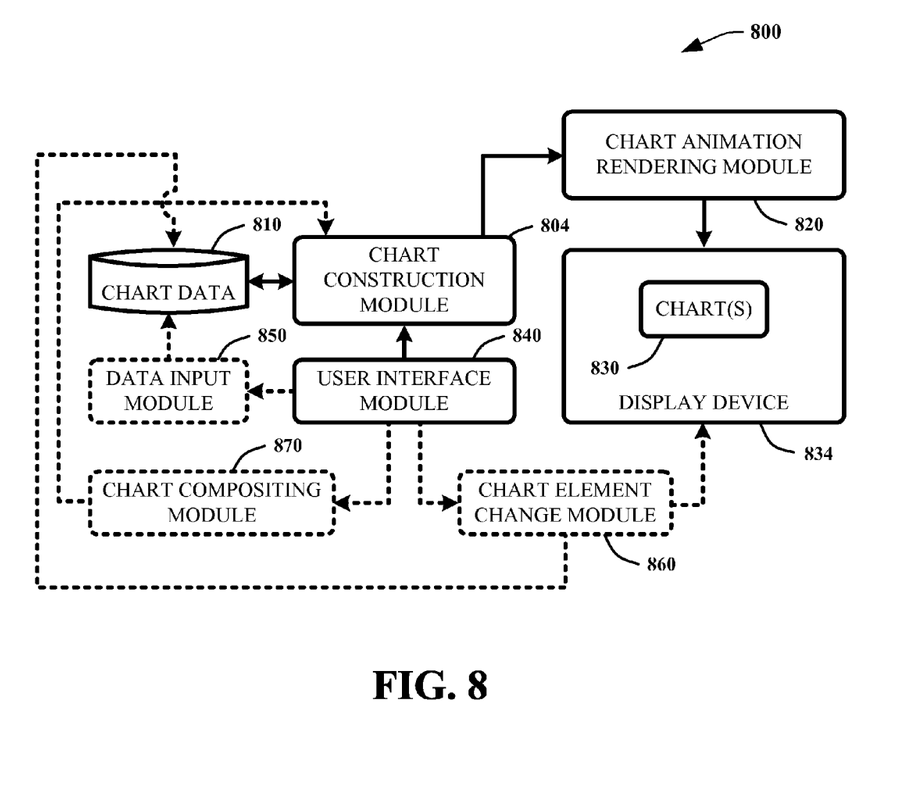
FIG. 8 illustrates an example system for transitioning or morphing between dynamic display visualizations.

Referring to FIG. 8, an example system 800 is illustrated for transitioning or morphing between dynamic display visualizations. In general, a Charting Animator process generally begins operation by using a chart construction module 804 to define parameters used to construct one or more charts (e.g., Pie Charts, Bar Charts, Line Charts, Area Charts, Plateau Charts, etc.) using one or more sets of chart data 810. The chart construction module 804 then provides these parameters to a chart animation rendering module 820 which renders chart(s) 830 on a display device 834 (or surface).

When the chart(s) 830 have been rendered on the display device 804, changes to the rendered chart(s) are enabled using any of several aspects. For example, in one aspect, a user interface module 840 is utilized to modify one or more of data elements comprising the chart data 810 via a data input module 850. Modifications to these data elements include changing the value of one or more of the data elements, adding one or more data elements, and deleting one or more data elements. In general, these data elements are maintained in a conventional computer readable format, such as, for example, in a list, table, database, and so forth. Consequently, direct modifications to the data elements by using a user interface to change the data elements via the data input module 850 can be accomplished using conventional techniques.

When data elements have been modified, the chart construction module 804 determines new chart parameters corresponding to the modified data elements, and passes those chart parameters to the chart animation rendering module 820. At this point, the chart animation rendering module 820 then morphs the existing charts(s) 830 into new chart(s) 830 using a dynamic animation that smoothly transitions from the existing chart(s) to the new chart(s) on the display device 834.

In another aspect, changes to the rendered chart(s) 830 are enabled by directly modifying one or more elements of the chart(s), such as, for example, resizing the height of one or more bars on a Bar Chart, or changing the size of a pie slice in a Pie Chart. In various aspects, direct modification of the elements of the chart(s) is accomplished via the user interface module 840 which allows the user to select one or more individual elements of one or more charts 830 using a graphical user interface provided via a chart element change module 860. This graphical user interface provides a graphical interface to chart(s) 830 being rendered on the display device 834 for resizing, moving, sorting, or deleting one or more of those chart elements. Similarly, chart elements can also be added to one or more of the chart(s) 830 via the graphical user interface provided by the chart element change module 860.

When any chart elements have been modified (by resizing, moving, sorting, deleting, adding, etc.), the chart element change module 860 then automatically modifies the corresponding data elements of the chart data 810 (or adds new values to the chart data) to fit changes made to the chart elements. For example, if a bar in a Bar Chart originally had a value of "10," then that bar was resized via the chart element change module 860 to show a value of "5" on the display device 834, then the chart element change module can change the value of the corresponding data element to "5" in the chart data 810.

Depending upon the chart(s) being displayed, many of the chart elements are often interdependent. Consequently, changes to one data element (either via the data input module 850, or via the chart element change module 860) used to construct the chart will often have an effect either on other data values, or on the displayed chart(s) 830. For example, if a pie slice in a Pie Chart is deleted or resized, or the underlying data value is changed, the other slices in the Pie Chart can be resized so that the Pie Chart retains a full pie shape. Therefore, when a change to data elements of the chart data 810 occurs (by any mechanism described herein), the chart construction module 804 determines new chart parameters corresponding to the modified data elements, and passes those chart parameters to the chart animation rendering module 820. At this point, the chart animation rendering module 820 then morphs the existing charts(s) 830 into new chart(s) 830 utilizing a dynamic animation that smoothly transitions from the existing chart(s) to the new chart(s) on the display device 834

In yet another aspect, a chart compositing module 870 is accessed via the user interface module 840 for creating a composite chart from two or more existing charts 830. In general, the user can use the chart compositing module 870 to specify (or select from a predefined list) some mathematical relationship between two or more existing charts 830. This mathematical relationship is then used to construct a composite chart by passing composite chart parameters to the chart construction module which in turn passes those parameters to the chart animation rendering module which acts to render the composite chart on the display device as an animation that morphs the existing charts into the composite chart.

Figure 9:
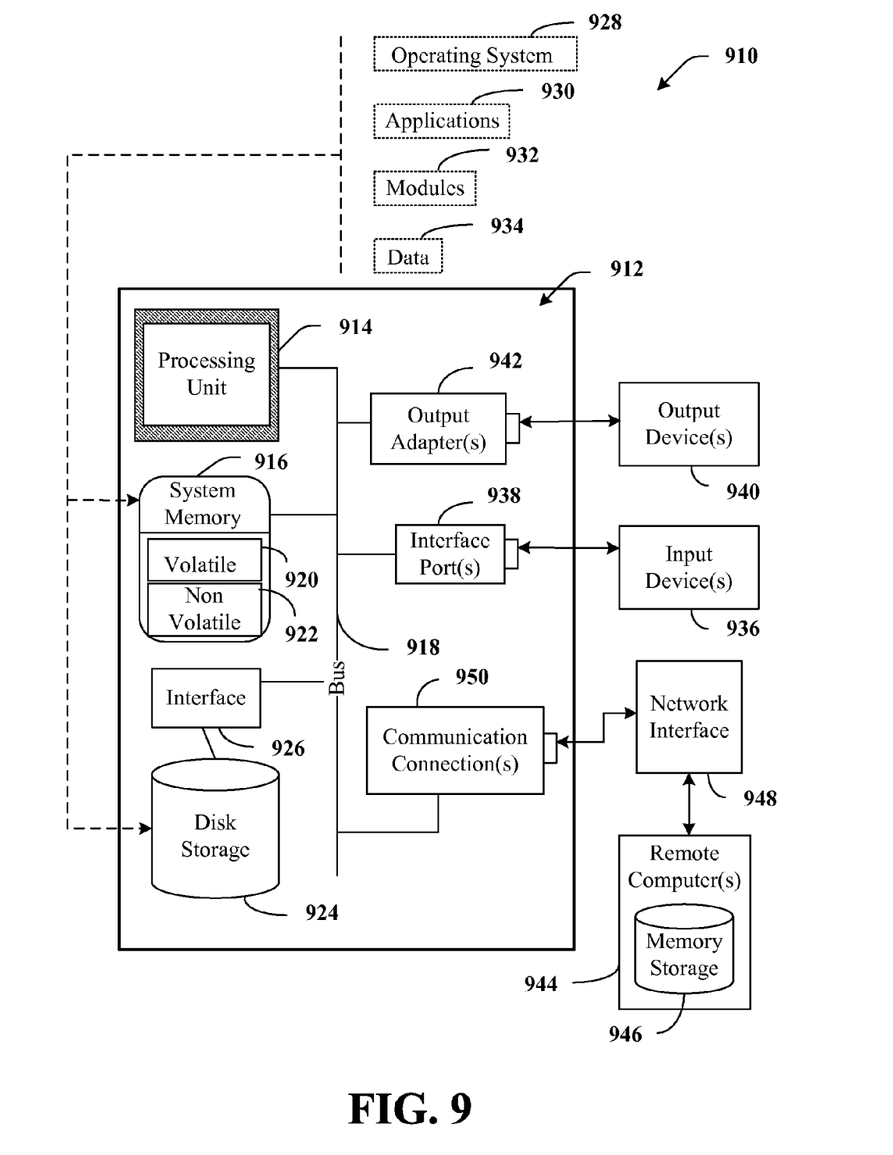
FIG. 9 is a schematic block diagram illustrating a suitable operating environment.
Figure 10:
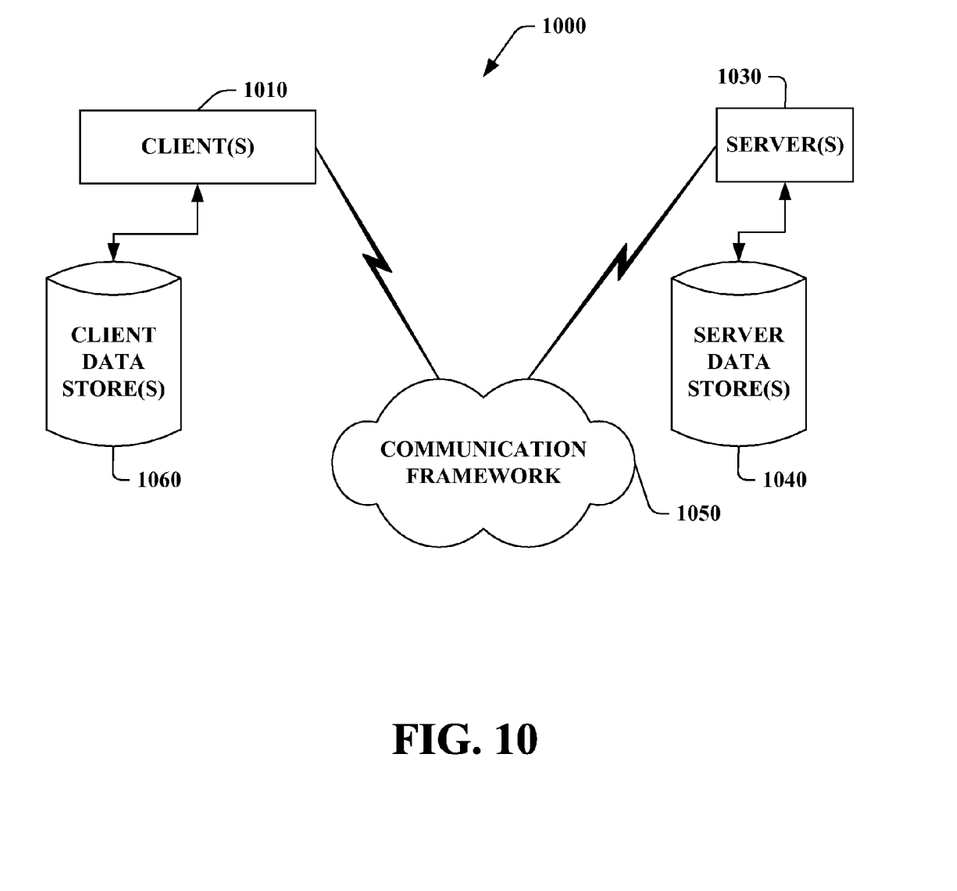
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary environment 910 for implementing various aspects described herein includes a computer 912. The computer 912 includes a processing unit 914, a system memory 916, and a system bus 918. The system bus 918 couple system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 64-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030. It is noted that some of the computation may be performed on either side of a network, with a thin visualization being local. Similarly, mobile devices such as a cell phone can be applicable for visualizations since there is only so much screen size, and thus making a decision about what to show is relevant.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   memory;
   at least one processor to execute components stored in the memory, the components including:
   a metadata component to describe characteristics of data;
   an analyzer to:
   identify a peer group based at least in part on information in a user profile of a designer that is to craft a desired visualization form for the data; and data mine information associated with the peer group to identify or infer attributes associated with knowledge of users or peers of the peer group regarding a design of visualization forms associated with the characteristics of the data; and
   a wizard component to:
   determine a subset of potential visualization forms suitable for visualizing the data based at least in part on the characteristics of the data and the attributes of the peer group; and
   display the subset of potential visualization forms to the designer.

2. The system of claim 1, the metadata component provides tags that indicate what type of users or peers have previously operated on similar types of data or data sets, tags that indicate suitable visualization forms or subsets given a respective data type, tags that indicate a relationship between the designer and one or more other members of the peer group, or tags that represent an annotation that describes how a particular visualization was created in the past or how a particular data set was visualized.

3. The system of claim 1, the analyzer includes at least one of a data mining component or a learning component to determine the potential visualization forms.

4. The system of claim 1, the knowledge is determined based at least in part on analysis of at least one of a local or a remote database associated with the peer group.

5. The system of claim 1, further comprising a profile component to determine an intent of a user, the profile component identifies at least one of a defined status of the designer or an organizational affiliation of the designer.

6. The system of claim 5, the profile component includes a status field, an organizational chart, a correspondence field, a learning component, a policy component, or a statistical component used to determine at least one of the intent of the designer or an association between the designer and the peer group.

7. The system of claim 1, the wizard component further comprising an attribute processor to analyze characteristics of the users or peers of the peer group to identify the attributes associated with the knowledge.

8. The system of claim 1, the wizard component further comprising an intent filter for customizing the subset of potential visualization forms based at least in part on a determined intent of the designer.

9. The system of claim 1, the wizard component further comprising a debugging component to provide intelligent crosschecks to determine that the subset of potential visualization forms are associated with a design goal or a design intent of the designer.

10. The system of claim 1, the wizard component further comprising a collaborative analyzer to store collaborative results associated with the design of visualization forms associated with the characteristics of the data.

11. The system of claim 1, the wizard component further comprising a template generator to capture visualization foundations.

12. The system of claim 1, the wizard component further comprising one or more controls to facilitate visualization design.

13. The system of claim 1, the wizard component further comprising a component to determine derivations for visualizations.

14. The system of claim 1, the wizard component further comprising an annotation component to analyze prior visualizations or to allow users to add annotations to a current visualization.

15. The system of claim 1, the wizard component further comprising a spreadsheet component for data mining a spreadsheet to obtain visualization design information.

16. A method, comprising:
- identifying a peer group based at least in part on characteristics of a user that is to craft a desired visualization form for a current data set;
- data mining stored knowledge data of the peer group to identify or infer a knowledge of the peer group related to a visualization form design associated with the current data set;
- determining, by at least one processor, a subset of potential visualization forms based at least in part on the knowledge and metadata associated with the current data set; and
- displaying the subset of visualization forms to the user in order to select a suitable visualization form for visualizing the current data set.

17. The method of claim 16, further comprising analyzing annotations to determine design alternatives.

18. The method of claim 17, further comprising generating help assistance to aid in design of visualizations.

19. The method of claim 16, further comprising analyzing prior visualizations or data sets via data mining or learning components.

20. A system, comprising:
- memory;
- at least one processor to execute components stored in the memory, the components including:
  - an analyzer component to:
    - identify a peer group based at least in part on characteristics of a user that is to craft a desired visualization for a data set; and
    - data mine knowledge data of the peer group to identify or infer a knowledge of the peer group and related to visualization design expertise associated with the current data set; and
- a wizard component to generate and display at least one visualization for the data set based at least in part on the knowledge and a respective type of the data set.

* * * * *